April 30, 1929.  H. M. HERBENER  1,710,979
METHOD AND APPARATUS FOR MAKING MATTRESSES
Original Filed Jan. 18, 1926  7 Sheets-Sheet 1
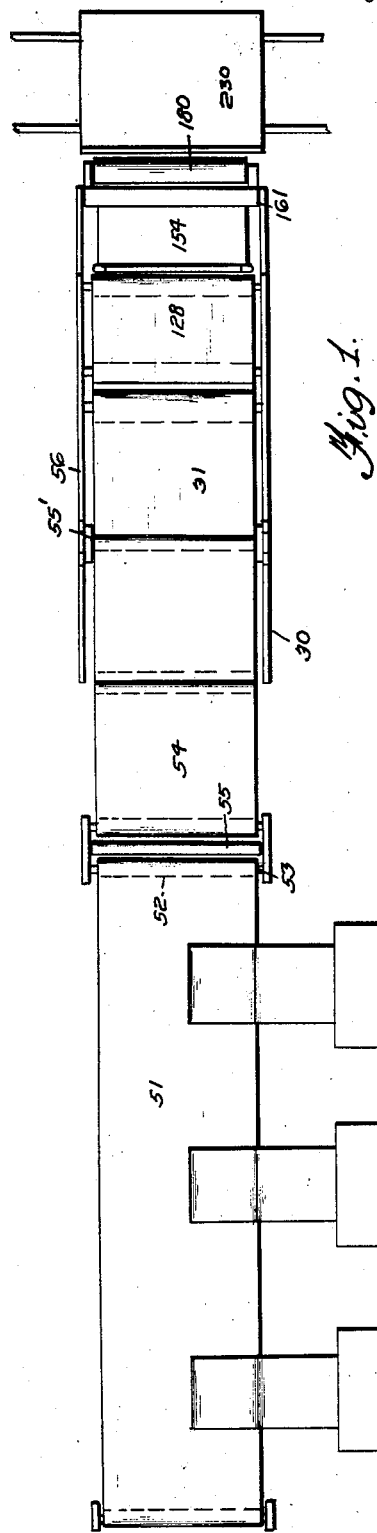
Inventor
Henry M. Herbener,
By
Attorney

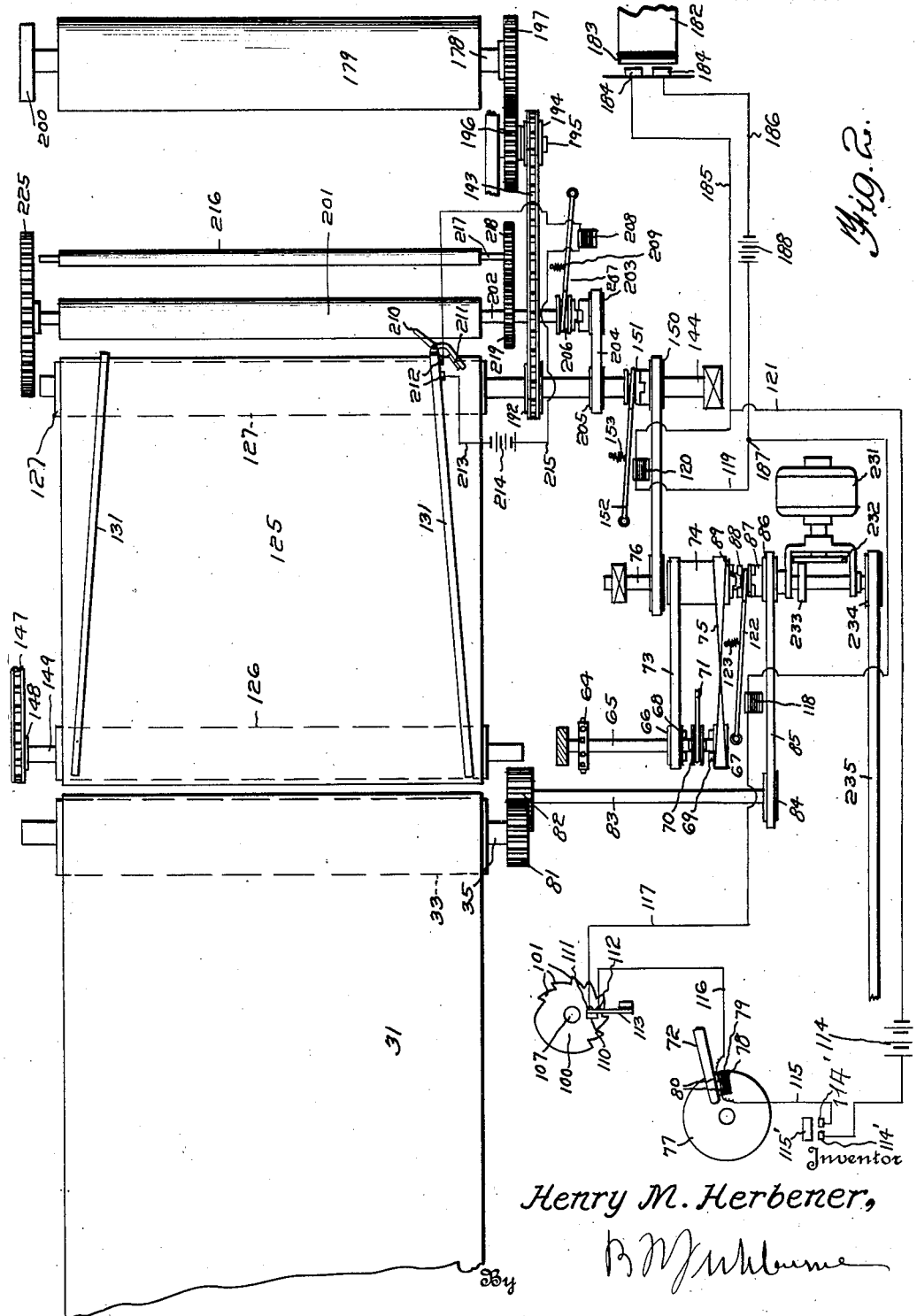

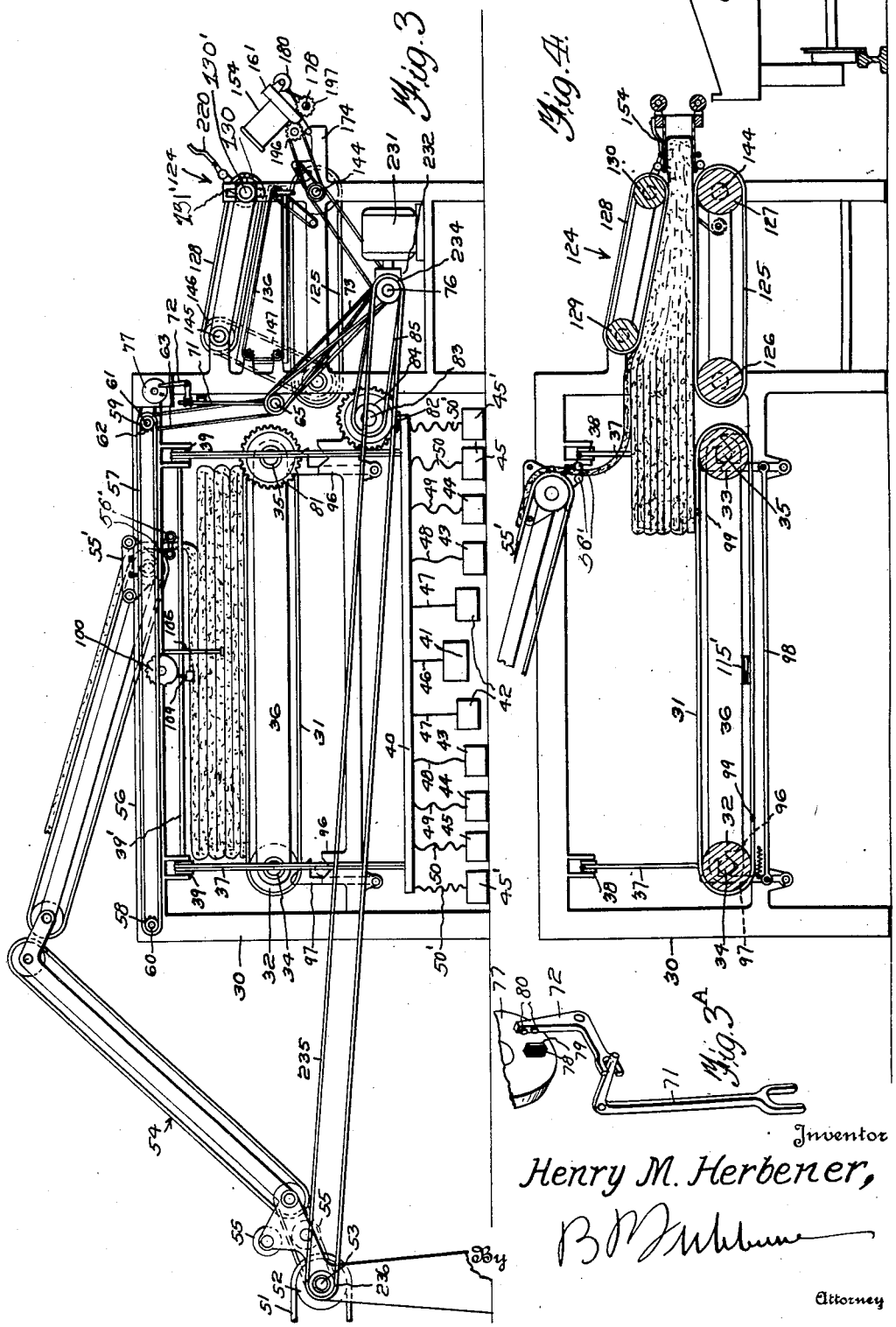

April 30, 1929.                H. M. HERBENER                1,710,979
                    METHOD AND APPARATUS FOR MAKING MATTRESSES
                    Original Filed Jan. 18, 1926        7 Sheets-Sheet 4

Inventor
Henry M. Herbener,
By
Attorney

April 30, 1929. H. M. HERBENER 1,710,979
METHOD AND APPARATUS FOR MAKING MATTRESSES
Original Filed Jan. 18, 1926 7 Sheets-Sheet 5

Inventor
Henry M. Herbener
By B. P. Fishburne
Attorney

April 30, 1929.  H. M. HERBENER  1,710,979
METHOD AND APPARATUS FOR MAKING MATTRESSES
Original Filed Jan. 18, 1926   7 Sheets-Sheet 6
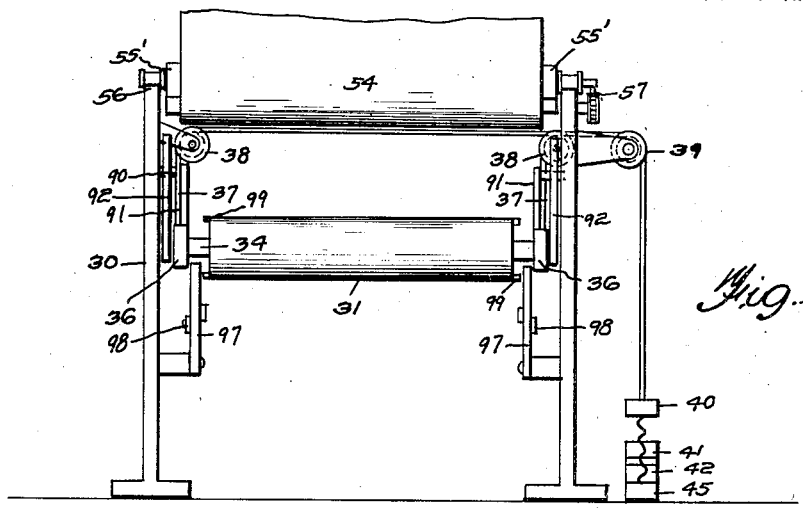
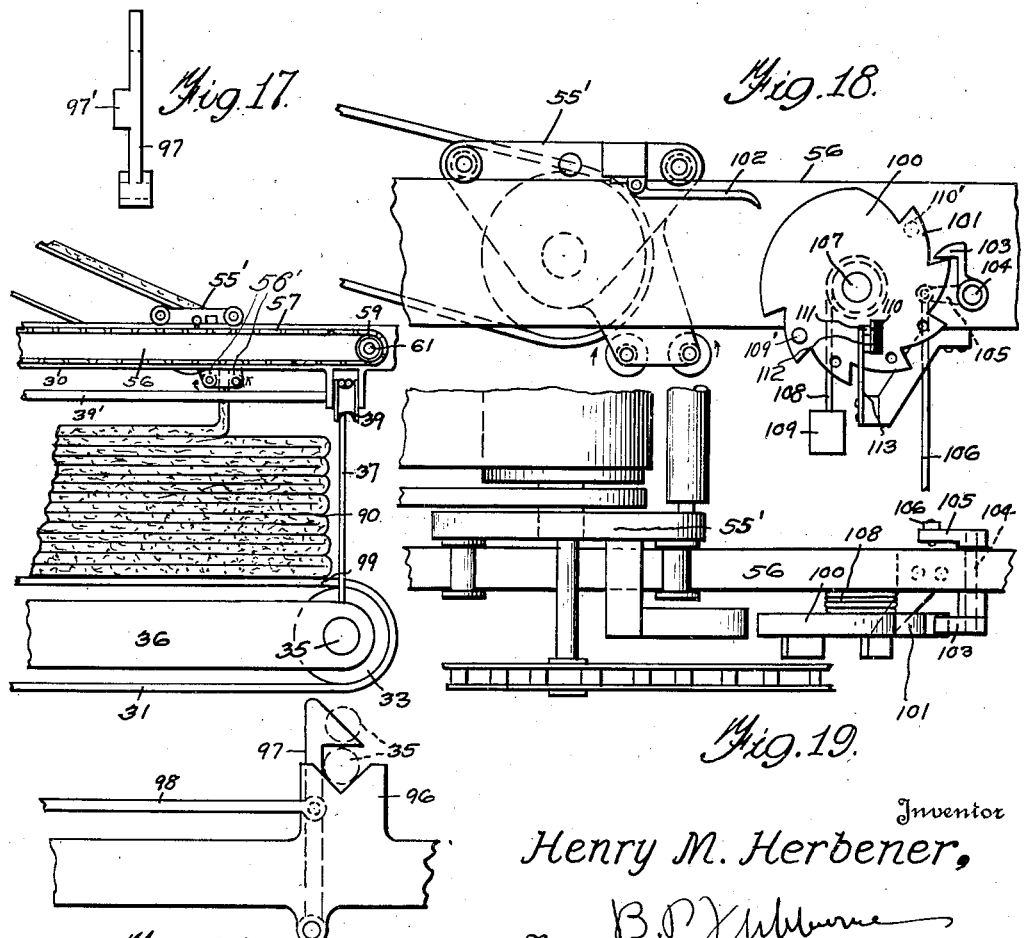
Inventor
Henry M. Herbener,
By B. P. Yubburne
Attorney

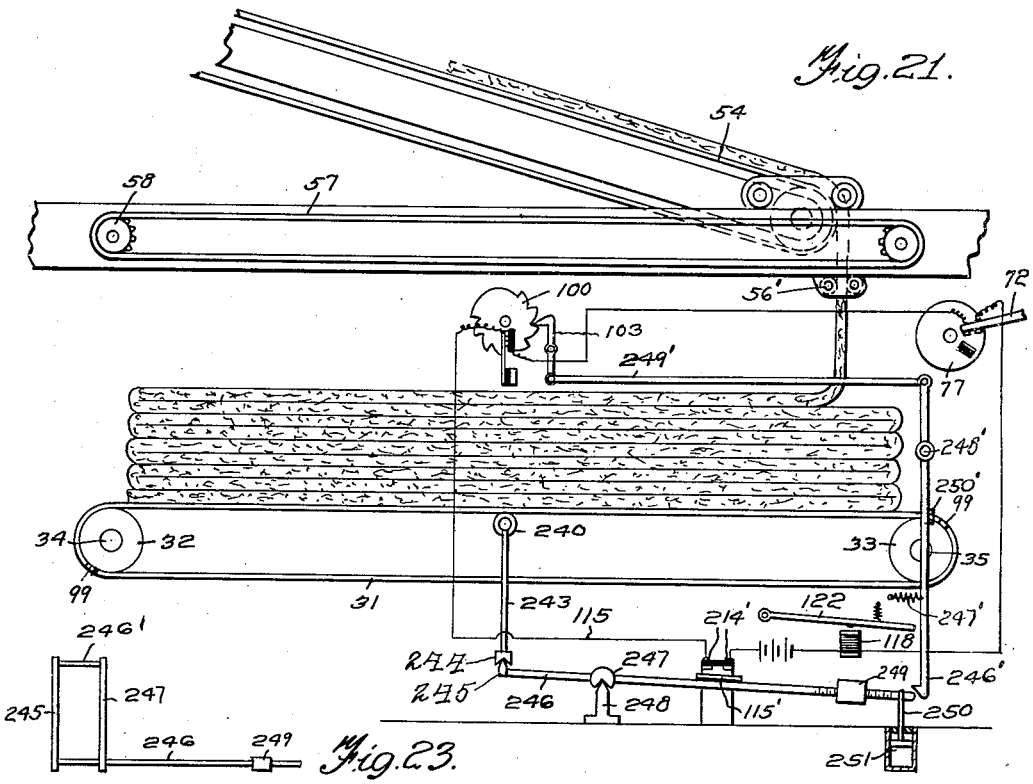
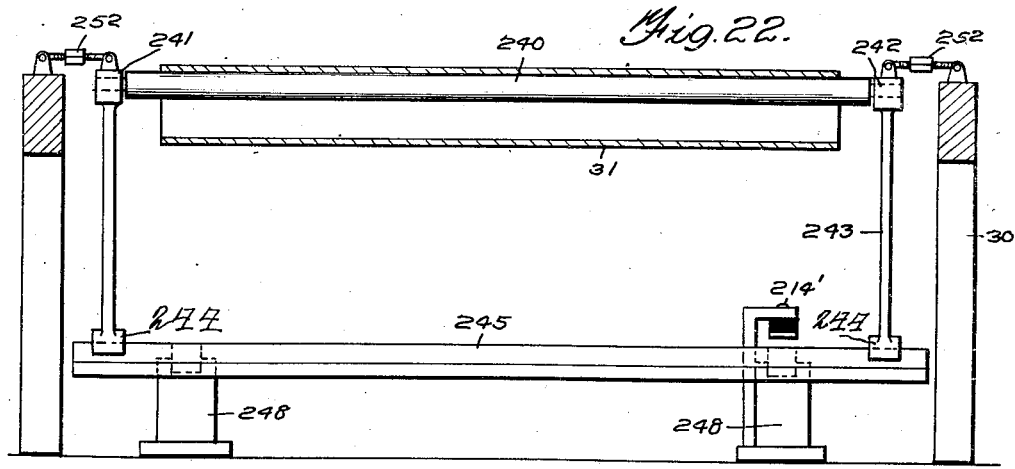
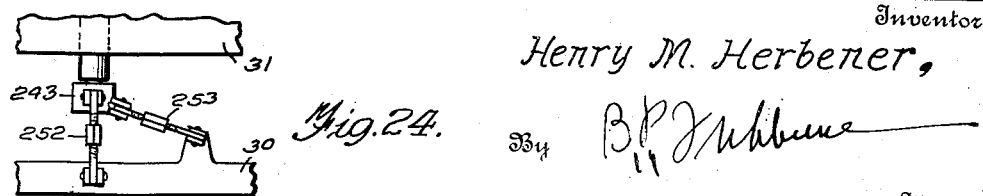

Patented Apr. 30, 1929.

1,710,979

UNITED STATES PATENT OFFICE.

HENRY M. HERBENER, OF THOMASVILLE, GEORGIA, ASSIGNOR, BY MESNE ASSIGNMENTS, TO CONSOLIDATED MATTRESS CO., OF BOSTON, MASSACHUSETTS, A CORPORATION OF MASSACHUSETTS.

METHOD AND APPARATUS FOR MAKING MATTRESSES.

Application filed January 18, 1926, Serial No. 82,051. Renewed August 11, 1928.

My invention relates to a method of and apparatus for producing mattresses.

An important object of the invention is to provide an apparatus of the above mentioned character which will perform all of the operations automatically and continuously.

A further object of the invention is to provide means to mechanically feed the ticking as the felt is advanced to and through the spout of the stuffing mechanism.

A further object of the invention is to provide means for automatically lapping the layers of felt and having its operation automatically controlled by the weight of the felt, in the event that the weight of the lapped layers should be beneath the normal weight.

A further object of the invention is to provide means for maintaining substantially constant the distance that the felt drops from the discharge end of the camel back, in the lapping operation.

A further object of the invention is to provide a mattress stuffer of generally improved construction, and which has a large range of adjustment.

Other objects and advantages of the invention will be apparent during the course of the following description.

Figures 5, 6:
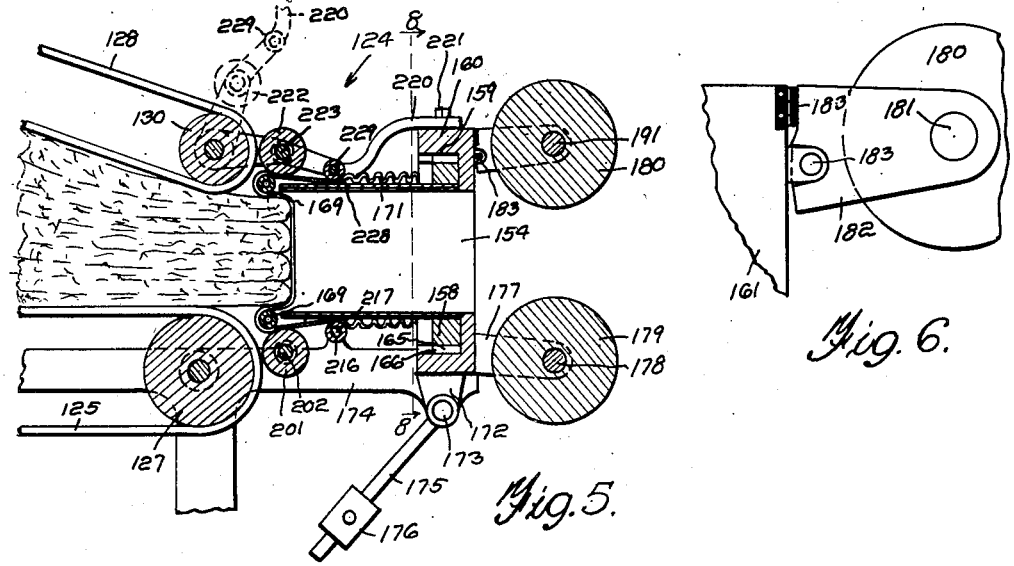
Figure 7:
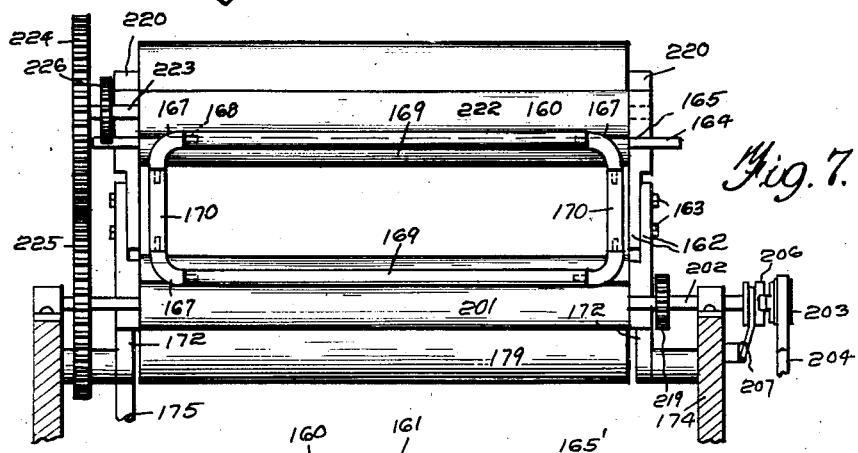
Figure 8:
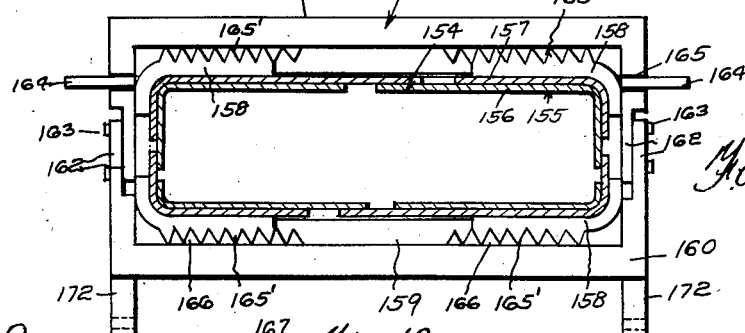
Figures 9, 10:
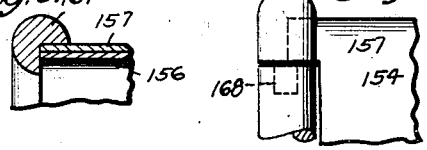
Figures 13, 14, 15:
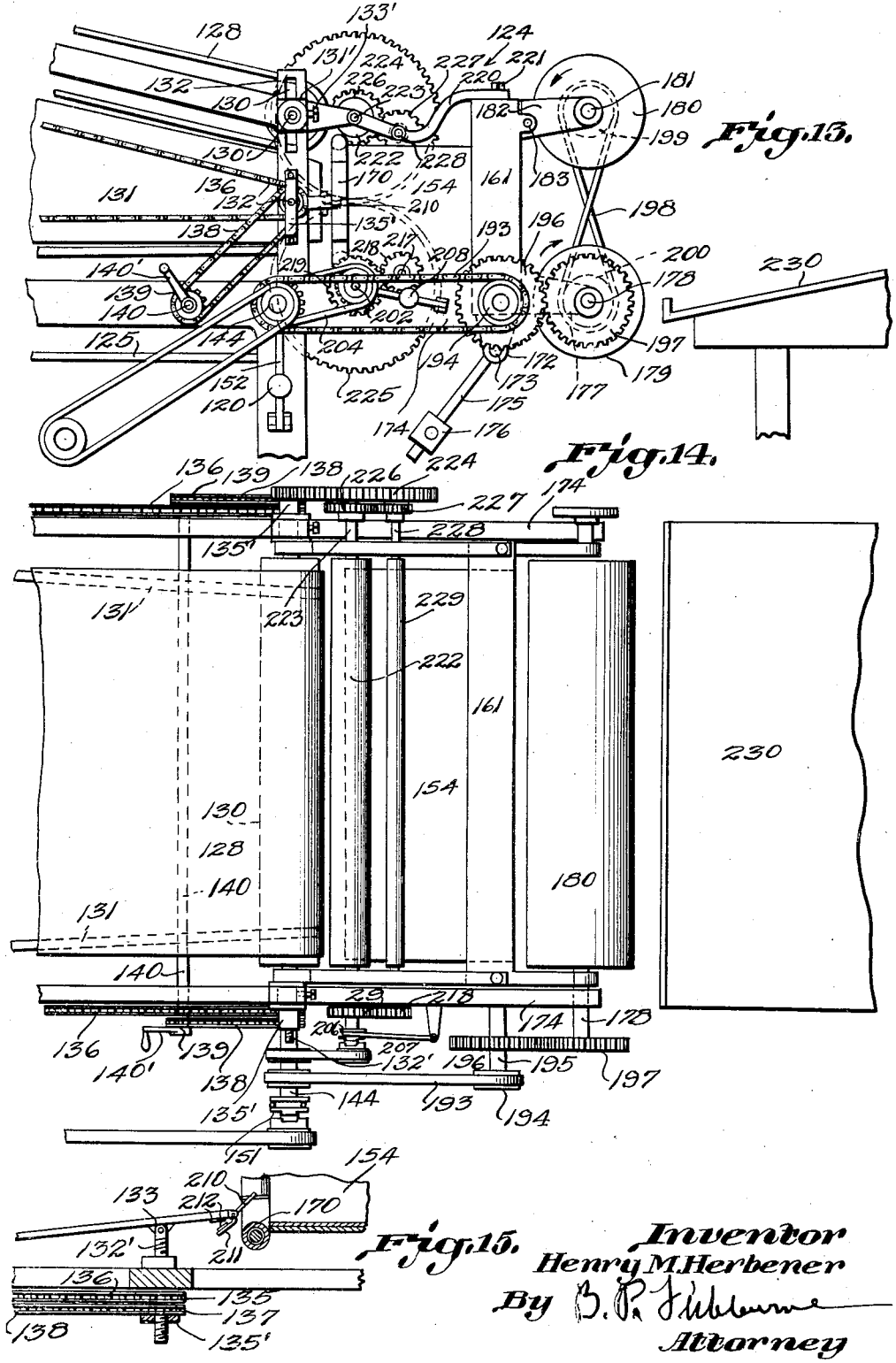

In the accompanying drawings forming a part of this specification, and in which like numerals are employed to designate like parts throughout the same, Figure 1 is a plan view, somewhat diagrammatic, of apparatus embodying the invention, Figure 2 is a similar view, showing the associated driving means and circuits, Figure 3 is a side elevation of the machine, Figure 3ª is a perspective view of a shifting lever, Figure 4 is a central vertical longitudinal section through a portion of the machine, parts omitted, Figure 5 is a central vertical longitudinal section through the mattress stuffing mechanism, Figure 6 is a side elevation of a discharge roll support, Figure 7 is a front end elevation of the stuffing device, Figure 8 is a transverse section taken on line 8—8 of Figure 5, Figure 9 is a detail section through the spout, Figure 10 is a fragmentary side elevation of the same, Figure 11 is a plan view of the felt compressing means, the upper belt being omitted, Figure 12 is a front end elevation of the compressing means, Figure 13 is a side elevation of the mattress stuffing device, showing the driving means therefor, Figure 14 is a plan view of the same, Figure 15 is a detail section showing a switch for actuating the ticking feeding means, Figure 16 is a front end elevation of the accumulator belt and associated elements, Figure 17 is an edge elevation of a dog, Figure 18 is a side elevation of a counter wheel and associated elements, Figure 19 is a plan view of the same, Figure 20 is a fragmentary side elevation of the accumulator belt and associated elements, Figure 21 is a diagrammatic view of a portion of a machine embodying a modified form of my invention, Figure 22 is a transverse section showing the scale associated with the accumulator belt, Figure 23 is a plan view of the scale beam, and, Figure 24 is a plan view of holding elements.

Attention being called to Figures 1 to 16, inclusive, the numeral 30 designates a frame work, supporting the various parts of the machine. Mounted within this frame work is an accumulator belt 31, which is horizontally disposed, and supported by rollers 32 and 33, carried by shafts 34 and 35, which are journaled in bearings formed in the frame beams 36. These frame beams 36, Figures 2, 4 and 16, are supported by cables 37, passing about pulleys 38 and 39. The pulleys 39 are preferably arranged upon the side of the machine, and the cables 37 extend downwardly and are connected with a horizontal beam 40. The pulleys 39 are rigidly mounted upon a shaft 39', so that both ends of the accumulator belt will move the same distance. The numerals 41, 42, 43, 44, 45, and 45' designate weights, of any preferred size. The weight 41 is of a suitable size to slightly overbalance the accumulator belt and associated elements suspended therewith, and this weight will return the accumulator belt to the raised position, when the other weights have descended to the lowermost position and are resting upon the floor. For the purpose of illustration, the combined weight of the pair of weights 42 would be ten pounds, and the same would be true of the remaining pairs of weights 43, 44, 45 and 45'. The weight 41 is attached to the beam 40 by means of a cable 46, weights 42 are attached to the beam 40 by cables 47, weights 43 are attached to the beam 40 by cables 48, weights 44 are attached to the beam 40 by cables 49, weights 45 are attached to the beam 40 by cables 50, and weights 45' are attached to the beam 40 by cables 50'. The cables 47 are longer than the cable 46, cables 48 longer than cables 47, cables 49 longer than cables 48, cables 50 longer than cables 49, and cables 50' longer than cables 50. When the accumulator belt is in the highest position, upon the beginning of the lapping operation, all weights rest upon the floor, and as the lapping starts, the weights 41 and 42 are first raised, and the succeeding pairs of weights are raised, as the lapped felt accumulates, upon the belt, 31, and this belt is lowered.

The numeral 51 designates a layer forming belt, receiving layers of fibrous material, such as linters or cotton from a suitable number of garnetting machines 51', such as three garnetting machines. The thickness of the layer produced upon the belt 51 will be regulated by the speed at which this belt travels, when the three garnetting machines are operating at a maximum speed. The forward end of the belt 51 is supported by a roller 52, mounted upon a drive shaft 53, which is driven by means to be described. The layer from the accumulator belt 51 discharges upon a camel back 54 of any well known or preferred construction, after having preferably passed through a pair of compression rolls 55, which serve to squeeze out the air from the layer, and these rolls are driven in unison with the belt 54. The discharge end of the camel back 54 is supported by carriages 55', which travel upon tracks 56. Suitably supported by the carriages 55' are guide rolls 56', between which the layer of fibrous material discharges, and these guide rolls are driven in opposite directions, as indicated by the arrows, by any suitable means, at the same speed as the belt of the camel back 54. The camel back is reciprocated over the accumulator belt 31 by means of a sprocket chain 57, the upper run of which is suitably attached to the carriage 55'. This sprocket chain passes over sprocket wheels 58 and 59, rigidly mounted upon transverse shafts 60 and 61. The shaft 61 carries a sprocket wheel 62, engaged by a depending sprocket chain 63, engaging a sprocket wheel 64, rigidly mounted upon a transverse shaft 65. This shaft 65, Figure 2, has pulleys 66 and 67, rotatable thereon, but held against longitudinal movement. The pulleys 66 and 67 have clutch faces 68 and 69, to be alternately engaged by clutch head 70, which is shifted in opposite directions by means of a vertically swinging bell crank lever 71, which is moved by a second bell crank lever 72, in a manner to be described. A straight belt 73 engages the pulley 66 and the pulley 74, and a crossed belt 75 engages the pulley 67 and the pulley 74. The pulley 74 is loosely mounted upon a common drive shaft 76, and the pulley 74 is continuously rotated, during the lapping operating, but is stopped when the accumulator belt is set into action. The numeral 77 designates a control wheel, which is suitably geared to the shaft 61, in a manner whereby the control wheel will make one complete revolution, when the chain 57 has traveled for a distance equal to the length of its upper run. When the control wheel 77 has made one complete revolution, a lug 78 carried thereby, shifts one end of the bell crank lever 72, whereby the direction of travel of the sprocket chain 57 is reversed. The lug 78 also carries a metallic contact 79, insulated therefrom, and adapted to engage contacts 80 carried by the bell crank lever 72, and insulated therefrom. When the lug 78 engages the bell crank lever 72, to mechanically shift it, it also will close a circuit between the contacts 80, for a purpose to be described.

The shaft 35 carries a gear 81 arranged above, and adapted to descend into engagement with the gear 82, rigidly mounted upon a shaft 83. This shaft carries a pulley 84, driven by a belt 85, which engages a pulley 86. The pulley 86 has a clutch element 87, to engage a clutch head 88, also adapted to engage a clutch head 89 carried by the pulley 74. The clutch head alternately locks the pulleys 74 and 86 to the common drive shaft 76. When the pulley 86 is locked to the shaft 76, the reciprocation of the camel back is stopped, and the accumulator belt 31 is driven, provided it has descended sufficiently, to cause gear 81 to engage gear 82.

As the accumulator belt approaches the lowermost position, the ends of its shafts 34 and 35 enter the forked ends of stationary guides or supports 96, and first press holding dogs 97 out of the way, which subsequently engage over these shafts 34 and 35, and hold them within the guides or supports 96, whereby the accumulator belt is held against any improper vibrations or movements. The dogs 97 are preferably spring pressed and are connected by links 98. The accumulator belt is provided with a pair of trip pins 99, which are equi-distantly spaced on the belt. When the accumulator belt is set into motion, in the lowermost position, by gear 81 engaging gear 82, and has traveled a distance equal to one-half of its length, the forward pin 99 will trip one of the dogs 97 by engaging the lug 97', thereof, Figure 17, and these dogs will release the accumulator belt, and as the felt will have been discharged from it, the various weights will return the accumulator belt to the uppermost position. Instead of employing the trip pins 99, I may trip the dog 97 by a control wheel, similar to the control wheel 77, which would be geared to the shaft 83.

In order that the accumulator belt may not be driven until a selected number of laps, having the maximum weight are deposited upon this belt, I provide a counter wheel 100, having teeth 101, extending over a portion of its periphery, while the remainder of the periphery is smooth. The counter wheel 100 is actuated by a pivoted pawl 102, secured to the carriage 55', see Figure 18. This pawl is pivoted so that it may be lifted, but it will not drop below the horizontal. Arranged near the counter wheel 100, is a holding dog 103, mounted upon a rock shaft 104, having a crank 105, pivotally connected with a trip rod 106, disposed in the path of travel of the frame beam 36 of the accumulator belt. The wheel 100 is rigidly mounted upon a shaft 107, having a cable 108, wound thereon, carrying a weight 109. Upon the upward movement of the accumulator belt the dog 103 is tripped and the weight will return the counter wheel 100 to the starting position. The weight 109 returns the counter wheel 100 to the starting position, as stated, and the movement of the counter wheel toward the starting position, is limited, by a stop pin 109', engaging a stationary stop 110', which is mounted upon the frame work. The stop 109' is so located that when the counter wheel is returned to the starting position, the dog 102 will advance the counter wheel for the distance of five steps or teeth. The number of steps that the pawl may advance the counter wheel, may be varied, by placing the stop pin 109' at other selected teeth 101, and to enable this to be accomplished, certain of the teeth may have openings, to receive the stop pin, as shown. Also the number of teeth may be varied, as found advantageous. The present arrangement, which is given for the purpose of illustration only, shows the counter wheel so arranged that it will be advanced five steps, by the dog 102 at which time the contact 110 will engage contacts 111 and 112. The counter wheel 100 carries a contact 110, insulated therefrom, adapted to make electrical contact between contacts 111 and 112, carried by a support 113, and insulated therefrom.

The numeral 114 designates a source of current having a wire 115 connected with the contact 80. The other contact 80 is connected with a wire 116, connected with the contact 112. The wire 117 is connected with the contact 111 and has an electromagnet 118 connected therein. The wire 117 is connected with a wire 119, having an electromagnet 120 connected therein, and the wire 119 is connected with a wire 121, connected with the opposite pole of the source of current 114. The electromagnet 118 is arranged adjacent to an armature carried by a pivoted lever 122, serving to shift the clutch head 88, and shifted in one direction, to lock the pulley 74 to the shaft 76, by means of a spring 123. The wire 115 also has upward contacts 114' connected therein, adapted to be engaged by a contact 115', carried by the beam 36, when the accumulator belt is in the lowermost position.

It is thus seen that when the camel back 54 has made the selected number of strokes, the counter wheel 100 will have been advanced, to the end of its travel, whereby contact 110 closes the circuit between contacts 111 and 112, and when the forward end of the camel back reaches the end of its stroke contact 79 will engage contact 80, at which time the pulley 74 will stop rotating and the pulley 86 will be set into motion, provided contact at 115' has been made since the circuit including the eletromagnet 118 is closed. The wheel 82 is now being driven and as the gear 81 is now in engagement with the gear 82, the accumulator belt will be driven and the felt discharged from the same. As soon as the load is removed from the accumulator belt, it rises, and the counter wheel 100 is automatically returned to its starting position, and hence the circuit including the electromagnet 118 is opened and the pulley 86 stopped and the pulley 74 set into action. The camel back now resumes this lapping operation.

When a selected amount of felt has been lapped upon the accumulator belt, the accumulator belt feeds the same into a stuffing mechanism, designated as a whole by the numeral 124, see more particularly Figures 3 to 15, inclusive. This stuffing mechanism embodies a lower endless belt 125, horizontally arranged, and passing about rollers 126 and 127. Arranged above the horizontal belt 125 is an inclined belt 128, engaging rollers 129 and 130. The stuffing mechanism further includes adjustable side boards 131, see more particularly Figure 11.

The roller 130 has its shaft 130' journaled in vertically adjustable bearings 131', slidable upon the slotted portions 132' of the frame and these slotted portions receive the shaft 130' and the contracted portions of the bearings. The bearings may be vertically adjusted and locked at selected elevations by means of set screws 133'. It is thus seen that the upper belt 128 and its roll 130 are vertically adjustable with relation to the lower belt 125, so that the degree of compression of the felt may be varied, and also to provide for adjustment in the event that the thickness of the felt is substantially varied, or the verical dimension of the ticking carrying spout to be described, is materially changed. The invention is in no sense restricted to the precise means for effecting the vertical adjustment of the upper compression belt 128, as other means may be employed for this purpose.

These side boards 131 are laterally adjustable, and for this purpose shafts 132 and 132′ have pivotal connection, at 133 with each side board. These shafts are screw-threaded and have slidable engagement brackets, not screw-threaded engagement, within openings formed in the frame 30. These screw-threaded shafts carry sprocket wheels 135, having screw-threaded engagement therewith, and held against longitudinal movement by brackets 135′, the screw-threaded shafts extending through openings in these brackets, and slidable therein, without having screw-threaded engagement therewith. The sprocket wheels 135 are connected by sprocket chains 136, whereby the pairs of sprocket wheels rotate together. The shafts 132′ also carry sprocket wheels 137, having screw-threaded engagement therewith, and rigidly connected with the adjacent sprocket wheels 135, to turn therewith. The sprocket wheels 137 are engaged by sprocket chains 138, engaging sprocket wheels 139. These sprocket wheels are rigidly mounted upon a transverse shaft 140, having a crank 140′, rigidly attached thereto, to turn the same. It is thus seen by turning the crank 140′ the side boards 131 may be simultaneously adjusted toward or away from each other.

The lower belt 125, is driven by a shaft 144, upon which the roller 127 is rigidly mounted. The upper belt 128 is driven by the roller 129, rigidly mounted upon the shaft 145, having a sprocket wheel 146 rigidly mounted thereon, engaging a sprocket chain 147, which extends downwardly to engage a sprocket wheel 148, rigidly mounted upon the shaft 149, upon which the roller 126 is rigidly mounted, see Figures 2 and 3. The gearing is such that the two belts 125 and 128 travel at the same speed, with their inner runs, traveling in the same direction. The shaft 144 has a pulley 150 loose thereon, which is adapted to be locked to the shaft 144 by means of a clutch head 151, shifted by a lever 152 to the locked position, when the electromagnet 120 is energized. The clutch head is shifted to the open position by a spring 153. As heretofore described, the electromagnets 118 and 120 are simultaneously energized, and it, therefore, follows that when the accumulator belt 31 is set into action, that the belts 125 and 128 of the stuffing mechanism are simultaneously driven.

The belts 125 and 128 compress the felt and feed it through a spout 154, shown more particularly in Figures 5 to 8, inclusive. This spout 154 is adjustable horizontally and vertically, and is formed in four corner sections 155, each of which corner sections embodies inner and outer sheet metal sections 156 and 157, rigidly attached together, and the ends of these sheet metal sections are disposed in stepped relation, so that the horizontal and vertical ends of the several corner sections overlap. This is for the purpose of providing a contact surface, all parts of which are disposed in the same planes. These corner sections 155 are rigidly mounted upon corner brackets 158. The brackets 158 are mounted within a recess 159, formed in frame sections 160, of a spout carrying frame 161. The frame sections are vertically adjustable, and for this purpose have overlapping parts 162, which are slotted, to receive clamping bolts 163. The upper corner brackets 158 are provided with long pins 164, supported within transverse slots 165, and this prevents the upper brackets from dropping, and the upper brackets are adjusted, toward or away from the lower brackets by the vertical adjustment of the frame sections 160. The upper and lower corner brackets 158 have teeth 165′, adapted to engage the teeth 166 formed in the horizontal walls of the recess 159. The brackets 158 may be moved horizontally toward each other, to the selected position, and then shifted into the recess 159, and the teeth 165′ and 166 will interlock and hold the several parts of the spout in the horizontal adjustment, the pins 164 being sufficiently long for this purpose. Welded or otherwise rigidly attached to the corners of the corner spout sections 155 are curved guide heads 167, carrying stub-shafts 168, rotatably mounted within openings formed in the ends of guide rollers 169 and 170. These rollers are removable so that rollers of the selected length may be substituted in accordance with the adjustment of the spout. The heads 167 and rollers 169 and 170 constitute a continuous curved contact surface, over and about which the mattress ticking 171 is fed, by means to be described. The spout frame 161 is pivotally supported, and for this purpose it is provided with depending knuckles 172, which are clamped upon a horizontal rock shaft 173, pivotally supported upon a portion 174 of the framework. This rock shaft has a crank or arm 175, rigidly connected therewith, having a counter weight 176 adjustable thereon.

Rigidly attached to the rear side of the spout frame 161, at its bottom, are brackets 177, rotatably holding a shaft 178, rigidly supporting a discharge roller 179. Co-acting with the lower roller 179, is an upper discharge roller 180, rigidly mounted upon a shaft 191, rotatably held by brackets 182. Both of these brackets 182 are pivoted to the upper portion of the spout frame 161, as indicated at 183, and are capable of partaking of only a restricted vertical swinging movement. One of the swinging brackets 182 carries a contact 183′, insulated therefrom, and adapted to engage stationary contacts 184, see more particularly Figure 2. One contact 184 is connected with a wire 185, connected with the wire 121. The other contact 184 is connected with a wire 186, connected with a wire 119, at 187, and a source of current 188 is connected in the wire 186. It is thus seen that when the mattress passes into and through the spout for a sufficient distance to enter between the discharge rollers 179 and 180, that the roller 180 is elevated and contact 183′ will electrically connect contacts 184, and a circuit will be closed for energizing the magnet 120. In this circuit, current will pass from one pole of the source of current 188, through a part of the wire 186, a portion of wire 119, electromagnet 120, a portion of wire 121, wire 185, contact 184, contact 183′, contact 184, and through a portion of the wire 186, back to the opposite pole of the source of current. The purpose of this arrangement is to keep the electromagnet energized, upon the rising of the top delivery roller, as the stuffing mechanism must complete its operation, to completely discharge the mattress therefrom. When the mattress passes from between the discharge rollers 179 and 180, the circuit will be broken at the contact 183, and the electromagnet 120 will be de-energized and hence the driving of the stuffing mechanism will stop.

Rigidly mounted upon the shaft 144 is a sprocket wheel 192, engaged by a sprocket chain 193, extending forward to engage a sprocket wheel 194 rigidly mounted upon a stub-shaft 195, rotatably supported upon a portion of the frame work. This stub-shaft drives a gear 196, which is eccentric with respect to the pivot of the frame 161. The gear 196 is mounted upon the stationary frame work and not upon the pivoted frame 161. The shaft 178 of the lower roller 179 carries a gear 197, which is brought into engagement with the gear 196, when the spout 158 is in the horizontal position, and hence the lower discharge roller 179 is driven. The rotation of the roller 179 is imparted to the upper roller 180 by means of a crossed belt 198, engaging a pulley 199 on the upper shaft 181, and a pulley 200 on the lower shaft 178. This belt 198 is sufficiently slack to permit of the slight swinging movement of the pivoted bracket 182. The invention is in no sense restricted to the use of the gearing embodying the belt 198, as any other suitable gearing may be employed. Associated with the spout 155, is tick feeding means. This tick feeding means embodies a lower feeding roller 201, which is rigidly mounted upon a transverse shaft 202. This roller is preferably formed of rubber, and clamps the ticking against the lower spout roller 169. The shaft 202 is suitably journaled in the frame work and has a pulley 203 loose thereon, which is driven by a belt 204, engaging a pulley 205, which is fixed upon the shaft 144. The pulley 203 is locked to the shaft 202 by a clutch head 206, shifted by a lever 207, which is thrown to the closed position by an electromagnet 208, when it is energized, and shifted to the open position by a spring 209. Pivoted upon one side board 131 is a lever 210, held in the open position by a spring, and carrying a contact 211, insulated therefrom, and adapted to engage contacts 212, mounted upon the side board and insulated therefrom. One contact 212 is connected with a wire 213, connected with one pole of a source of current 214, and a wire 215 is connected with the opposite pole of this source of current and with the other contact 212, and the circuit has the electromagnet 208 connected therein. It is thus seen that the tick feeding means is not set into action as soon as the stuffing mechanism is started, for it is not desired to feed the tick until the felt reaches it, as clearly indicated in Figure 5. When the felt reaches the tick, it will push the lever 210 outwardly and contact 211 will connect contacts 212.

Working in conjunction with the lower contact feed roller 201 is a retarding roller 216, preferably formed of polished steel, and this roller is rigidly mounted upon a shaft 217, supported by the stationary frame work, and having a gear 218, rigidly mounted thereon, engaging a gear 219, rigidly mounted upon the shaft 202. The retarding roller 216 is therefore, driven in an opposite direction to the feeding roller 201, and these rollers engage the lower side of the ticking, feed it, and retain it suitably taut, during the feeding operation, to prevent the same from wrinkling or folding.

Arranged above the spout 155, are supporting arms 220, which are pivoted upon the shaft 130′. The rear ends of these arms may be detachably clamped to the frame 161 by bolts 221. The numeral 222 designates the upper tick feeding roller, preferably formed of rubber, and clamping the tick against the upper spout roller 169. The roller 222 is carried by a shaft 223, and driven thereby, and this shaft is journaled in the arms 220, and has a gear 224, rigidly mounted thereon, which is adapted to engage a gear 225, rigidly mounted upon the lower shaft 202. The gears 224 and 225 are preferably removable, so that different size gears may be substituted therefor, which would be necessary when the arms 220 are vertically adjusted, as by the elevation of the shaft 130′, for the reasons heretofore stated. Instead of employing these two gears, any other suitable form of gearing may be employed, which will permit of suitable adjustment. The shaft 223 is also provided with a gear 226, engaging a gear 227, rigidly mounted upon a shaft 228, journaled in the arms 220. This shaft carries a retarding roller 229, preferably formed of polished steel, which engages the tick. The retarding roller rotates in an opposite direction to the feeding roller 222. The function of this retarding roller is the same as described in connection with the retarding roller 216.

The ticking 171 is turned inside out and placed upon the exterior of the spout 155, as clearly illustrated in Figure 5, and is positively fed from the spout, as the compressed felt passes into the spout and ticking. When the filled ticking passes from between the discharge rollers 179 and 180, it falls upon an inclined table 230, mounted upon wheels, and is then carried to the sewing machine, where the usual sewing operation occurs, to close the ticking.

The numeral 231 designates a motor, or other source of power, driving a friction disc 232, engaging a friction disc 233, which is splined upon the power shaft 76 and shifted longitudinally thereof by any suitable means. This arrangement is provided so that the entire apparatus may have its parts driven in unison at a selected speed. The shaft 76 also drives a pulley 234, engaged by a belt 235, extending forwardly to drive a pulley 236, which drives the layer forming belt 51. The weight of each layer depends upon the speed of the machine.

The operation of entire apparatus is as follows:

The fiber layers from the garnetting machines 51′ are fed to the floor apron or layer producing belt 51, by camel backs or other suitable means, and pass therefrom through compression rollers to the camel back 54. The camel back reciprocates above the accumulator belt 31, and laps the layer upon this accumulator belt, producing felt of a desired weight or thickness. When all of the garnetting machines 51′ are properly operating at the maximum speed, they will produce a layer upon the accumulator belt 31, weighing substantially five pounds per layer. This accumulator belt is in the uppermost position upon the starting of the lapping operation, and gradually descends as the weight of the felt increases upon the accumulator belt, and the distance between the discharge end of the camel back and the upper surface of the felt is thereby maintained substantially constant. If the contact 110 is set upon the counter 100, for closing the circuit, when five teeth 101 have been advanced, then when ten laps have been laid upon the accumulator belt, the circuit will be closed at the contact 110. When the discharge end of the camel back reaches the end of the forward stroke, on the tenth lap, the circuit is also closed at the contact 79, and the gear 81 will engage gear 82 and the circuit will be closed at 115′. When the circuit is closed, as above stated, the electromagnet 118 is energized, and the pulley 74 stopped and the pulley 86 rotated. The camel back now stops in the forwardmost position and the accumulator belt is driven to discharge the felt to the compressing means of the mattress stuffing machine and receives an additional layer on top from the camel back as delivery is made, thus making operation continuous. When the electromagnet 118 is energized, the electromagnet 120 is also energized and the belts 125 and 128 are driven, and also the discharge rollers 180 and 179. The felt is thus fed into and through the spout 155, and passes between the discharge rollers, and the roller 180 is elevated and the circuit closed at 183, and the electromagnet 120 is energized from the source of current 188. The electromagnet 118 is de-energized which occurs when the finger 99 trips the dogs 97, after the accumulator belt has traveled for a distance equal to one-half its length. Hence, the discharge rollers will continue to operate until they have completely discharged the filled ticking, after the accumulator belt has stopped. When the camel back has its reciprocating motion arrested in the forward position, its belts continue to drive, and an additional layer is laid upon the top of the felt, as the felt is being discharged, thus making the operation continuous, and the first layer on the accumulator belt will start at about the time the finished felt reaches the discharge end of the accumulator belt, the reciprocating action of the camel back being then restored. In the event that the garnetting machines are not feeding the correct maximum weight of layers the action of the counter wheel is checked against by the weighing means, for the circuit must also be closed at the contact 115′ which will occur only when the accumulator belt has reached the lowermost position. Therefore, should the counter wheel 100 be advanced five steps, the lapping operation will continue until the proper weight of the felt is had, and when the camel back then reaches the forward position, the accumulator belt will then move to the lowermost position, and the circuits for the electromagnets 118 and 120 are closed, while the contact 79 engages contacts 80. The circuit remains closed at 110, for the counter wheel is held in the set position, until released by the upward movement of the accumulator belt. It is not desired to feed the ticking until the felt engages therewith, and when this occurs the felt will swing the lever 210 upon a pivot, closing the circuit of the electromagnet 208 at 211, and the tick feeding rollers 202 and 223 are set into action, and also the retarding rollers 216 and 229. The tick is, therefore, mechanically fed, in a proper timed order, with respect to the advancing felt. The filled tick passes through the spout and is discharged between the rollers 179 and 180. When the filled ticking clears the lever 210 the electromagnet 208 is de-energized, and when it clears the roller 179, the electromagnet 120 is de-energized.

Where the layer of the fibrous material being lapped upon the accumulator belt is thin, it is desirable that the drop of the layer be relatively short and constant, and for this reason the accumulator belt has been shown and described as elevated, and gradually descending as the thickness of the felt increases. However, where the layer of the fibrous material is relatively thick, the same is rendered sufficiently strong so that it will not tear, and the shortness of the drop upon the accumulator belt is not material.

In Figures 21 to 24, I have illustrated, partly diagrammatically, a modification of the machine, for lapping the relatively thick fibrous layer. In this modification, the accumulator belt 31 is supported in the frame work but does not partake of perceptible bodily vertical movement. The accumulator belt is permanently located the maximum distance beneath the camel back 54, which reciprocates above it and the layer is lapped upon the accumulator belt and the top of the felt approaches the rolls 56' of the accumulator belt. The same counter wheel 100 is employed for controlling the number of strokes made by the camel back, and the same control wheel is employed to close the circuit at that point when the camel back is at the end of its forward stroke.

However, since the descending movement of the accumulator belt is dispensed with, I provide a scale or weight means for closing the circuit at a third point, in the wire 115. This scale embodies a roller 240, extending transversely beneath the upper run of the accumulator belt, and engaging the same. This roller is mounted upon a shaft 241, rotatable within bearings 242, carried by upstanding arms 243. These arms are provided at their lower ends with heads 244, having inverted V-shaped recesses, receiving a knife-edge bar 245, which is rigidly mounted upon a pair of levers or scale beams 246' and 246. These levers are rigidly attached to a transverse member 247, having an inverted V-shaped recess, receiving the knife-edges of stationary pivots 248. The lever 246 extends beyond the head 247 and has its end screwthreaded for receiving an adjustable weight 249, of any preferred size. Connected with the free end of the lever 246 is a plunger 250, reciprocating within a cylinder 251, and this plunger and cylinder constitutes a dash-pot, to prevent vibrations of the lever.

In this form of the invention, the contact 115' which is mounted upon the accumulator belt frame is mounted upon the lever 246, and is adapted to engage the contacts 214'. When the circuit is closed the magnet 118 will be energized, and the lever 122 will be shifted toward the magnet, and the accumulator belt will be driven to discharge the felt to the stuffer, while the reciprocation of the camel back is stopped, but the belts or aprons of the camel back continues to run.

When the scale beam 24 has its outer end raised, and contact 115' engages contact 214', the scale beam is locked in this shifted position, by means of a dog 246', the lower end of which is beveled, as shown. When the free end of the scale beam rises, it will ride over the beveled face of the dog, and then catch upon the shoulder of the dog. This dog is held in the normal position by means of a retractile coil spring 247'. The dog 246' is pivoted at a point near and spaced from its upper end, as indicated at 248', and is also pivotally connected at its upper end with a link 249', which is pivoted to the lower end of the counter wheel dog 103. The dog 246' is provided beneath its pivot 248' with a laterally extending lug 250', arranged in the path of travel of trips or lugs 99, carried by the accumulator belt 31. It is thus seen that when the selected amount of felt has been formed upon the accumulator belt, the scale beam will be swung upon its pivot, and locked in this position, and the circuit will then be closed and the motor driven, which will effect the travel of the accumulator belt, for discharging the felt. The driving of the accumulator belt will continue until it has traveled for a distance equal to its upper run, at which time the scale beam is released and returns to the normal position, thus breaking the motor circuit, and at the same time the dog 103 will be shifted to release the counter wheel 100, which will be automatically returned to its starting position.

Connected with the top of the bearings 242 are adjustable elements or turn-buckles 252, pivoted thereto and to the frame work, to prevent the arms 243 from being laterally displaced. Similar longitudinal holding elements 253 are provided to prevent the longitudinal displacement of the arms. There is sufficient play between these holding elements and the bearings 242, to take care of the slight vertical movement of the roller 240.

It is thus seen that after the camel back has made the selected number of strokes, and has reached the forward end of its stroke, that the scale will function to check the operation of the accumulator belt, which cannot discharge the felt until the proper minimum weight or amount of felt has accumulated upon the belt.

I also contemplate providing means for raising the camel back while the accumulator belt is held against substantial vertical movement, as shown in Figures 21 and 22. In this event, the same arrangement of scale would be used.

It is to be understood that the forms of my invention herewith shown and described are to be taken as preferred embodiments of the same, and that various changes in the shape, size, and arrangement of parts may be resorted to, without departing from the spirit of my invention or the scope of the subjoined claims.

Having thus described my invention, what I claim is:

1. In a machine of the character described, a traveling accumulator support, a lapping device discharging upon the accumulator support, a mattress stuffing mechanism, means for reciprocating the lapping device with relation to the accumulator support and means for arresting the reciprocation of the lapping device and for driving the accumulator support and mattress stuffing mechanism.

2. In a machine of the character described, an accumulator support, a reciprocatory lapping device discharging upon the support, means to drive the lapping device, felt compressing means receiving the felt from the accumulator support, and means to arrest the reciprocation of the lapping device and to substantially simultaneously drive the accumulator support and compression means.

3. In a machine of the character described, an accumulator support, a lapping device discharging upon the support, means to drive the lapping device, felt compression means receiving the felt from the accumulator support, a ticking supporting spout arranged near the compression means, mattress discharging means arranged near said spout, means to arrest the action of the lapping device and to set the traveling support and compression means and mattress discharging means into operation, and means for continuing the operation of the compression means and discharging means after the accumulator support has stopped.

4. In a machine of the character described, an accumulator support, mattress stuffing mechanism arranged to receive the felt from the accumulator support, and means to substantially simultaneously start the driving action of the accumulator support and stuffing mechanism and to continue the driving action of the stuffing mechanism after the accumulator support has stopped.

5. In a machine of the character described, a traveling support, mattress stuffing mechanism arranged to receive felt from the traveling support, means to drive the traveling support and stuffing mechanism together and to continue the driving of the stuffing mechanism after the traveling support has stopped.

6. In a machine of the character described, a traveling support, mattress stuffing mechanism receiving the felt from the same, means for driving together the traveling support and stuffing mechanism, and means actuated by the stuffed mattress to continue the operation of the stuffing mechanism after the traveling support has stopped.

7. In a machine of the character described, a traveling support, felt compression means arranged near the same, a ticking supporting spout arranged near the compression means, ticking feeding means engaging the ticking on the spout, means to drive the traveling support and compression means, and means to set the feeding means into action after the compression means is thrown into action.

8. In mattress stuffing mechanism, felt compression means, a ticking supporting spout arranged to receive the felt from the compression means, means to drive the compression means, ticking feeding means engaging the ticking upon the spout, and means to drive the feeding means after the compression means has been set into action.

9. In mattress stuffing mechanism, felt compression means, a ticking supporting spout arranged to receive the felt from the same, ticking feeding means engaging the ticking upon the spout, and means to drive the compression means and feeding means.

10. In mattress stuffing mechanism, a ticking supporting spout, and ticking feeding means engaging said ticking.

11. In mattress stuffing mechanism, a ticking supporting spout, ticking feeding means engaging the ticking, and retarding means engaging the ticking.

12. In mattress stuffing mechanism, a ticking supporting spout, ticking feeding roller means engaging the ticking, ticking retarding roller means engaging the ticking, and means to drive the feeding roller means and retarding roller means in opposite directions.

13. In mattress stuffing mechanism, a ticking support having rollers engaging the ticking, and feeding rollers engaging the ticking against the spout rollers.

14. In mattress stuffing mechanism, compression means, a spout to receive the felt from the compression means, discharge roller means disposed near the spout, and means to drive the compression means and having its operation partly controlled by the roller discharge end.

15. The continuous method of producing a mattress, comprising lapping a continuous layer of fibrous material for producing a felt while holding the felt against longitudinal movement, effecting the longitudinal movement of the felt while continuing the feeding of the continuous layer upon its top, and compressing the felt and feeding it into a mattress ticking.

16. The continuous method of producing a mattress, comprising lapping a continuous layer of fibrous material for producing felt while retaining the felt against longitudinal movement during the lapping operation, discharging the felt from the lapping position by a longitudinal movement and lapping a layer upon the top of the felt while thus discharging it, and compressing the same and feeding it into a mattress ticking.

17. In a machine of the character described, a mattress ticking support, means to feed felt to the support for stuffing the mattress ticking, and roller means engaging the mattress ticking to positively feed the same.

In testimony whereof I affix my signature.

HENRY M. HERBENER.